(12) United States Patent
Hu

(10) Patent No.: US 7,313,936 B2
(45) Date of Patent: Jan. 1, 2008

(54) DISC BOX

(76) Inventor: Wen-Long Hu, 5F, No. 37, Hsing Ping Rd., Chung Li City, Tao Yuan Hsien (TW)

( * ) Notice: Subject to any disclaimer, the term of this patent is extended or adjusted under 35 U.S.C. 154(b) by 127 days.

(21) Appl. No.: 11/281,454

(22) Filed: Nov. 18, 2005

(65) Prior Publication Data

US 2007/0113601 A1 May 24, 2007

(51) Int. Cl.
*E05B 65/00* (2006.01)
(52) U.S. Cl. .............. 70/57.1; 206/308.1; 206/387.11; 206/1.5
(58) Field of Classification Search ............... 70/57.1, 70/63; 206/1.5, 308.1, 308.2, 387.11
See application file for complete search history.

(56) References Cited

U.S. PATENT DOCUMENTS

| | | | | |
|---|---|---|---|---|
| 4,966,020 A * | 10/1990 | Fotheringham et al. ....... | 70/276 |
| 5,147,034 A * | 9/1992 | Broadhead et al. .......... | 206/1.5 |
| 5,375,712 A * | 12/1994 | Weisburn ............... | 206/387.11 |
| 5,769,218 A * | 6/1998 | Yabe ..................... | 206/308.2 |
| 5,823,341 A * | 10/1998 | Nakasuji ................ | 206/387.11 |
| 5,850,752 A * | 12/1998 | Lax ....................... | 70/276 |
| 6,336,554 B1 * | 1/2002 | Bruhwiler .............. | 206/308.2 |
| 6,374,648 B1 * | 4/2002 | Mitsuyama ............. | 70/57.1 |
| 6,430,976 B1 * | 8/2002 | Mitsuyama ............. | 70/57.1 |
| 6,467,318 B1 * | 10/2002 | Gattiker ................. | 70/57.1 |
| 6,601,414 B1 * | 8/2003 | Chang .................... | 70/57.1 |
| 6,601,415 B2 * | 8/2003 | Takinami ................ | 70/57.1 |
| 6,666,330 B2 * | 12/2003 | Sedon et al. .......... | 206/387.11 |
| 6,694,782 B2 * | 2/2004 | Mitsuyama ............. | 70/57.1 |
| 6,880,372 B2 * | 4/2005 | Kim ....................... | 70/57.1 |
| 6,966,438 B2 * | 11/2005 | Belden et al. .......... | 206/308.1 |
| 7,028,836 B2 * | 4/2006 | Hsiao et al. ............ | 206/308.2 |
| 7,036,659 B2 * | 5/2006 | Mitsuyama ............. | 206/308.2 |
| 2002/0003095 A1 * | 1/2002 | Jaeb et al. .............. | 206/308.2 |
| 2004/0187530 A1 * | 9/2004 | Lax et al. ................ | 70/57.1 |
| 2006/0081020 A1 * | 4/2006 | Hsiao et al. ............ | 70/57.1 |

* cited by examiner

*Primary Examiner*—Suzanne Dinio Barrett
(74) *Attorney, Agent, or Firm*—Rosenberg, Klein & Lee

(57) ABSTRACT

A disc box includes a base, a securing member and a key member. The base has a lid and a body, which has a lateral side connected to that of the lid. The lid and the body include latching portions opposite to each other and key-reception portions adjacent to the respective latching portions. The latching portions are formed at an internal edge of the lid and the body respectively. The securing member is received in the latching portions for locking the lid and the body together so that the disc box is burglarproof. The key member is arranged inside the key-reception portions in order to reject the securing member that is clamped in the respective latching portion in advance. When the key member is drawn out, the securing member can be removed out at the same time.

3 Claims, 14 Drawing Sheets

DISC BOX

BACKGROUND OF THE INVENTION

1. Field of the Invention

The present invention relates to a disc box, and particularly to a disc box with a burglarproof structure for preventing the disc from being stolen.

2. Description of the Related Art

Reference is made to FIG. 1, which is a perspective view of a conventional disc box. The conventional disc box includes a box base 10a, which has a lid 12a and a body 14a connected with each other, and an opening portion 16a disposed at a lateral side of the box base 10a. The opening portion 16a has a recess so that the user can open it easily.

Usually, the box base 10 is designed with a common structure so as to secure the disc. If someone wants to remove the disc from the box, she or he just cuts a cover that encloses the box to open the lid 12a and the disc can be removed easily.

These shortcomings hinder the disc box from integrating with a system and raise its perplexity and complexity.

SUMMARY OF THE INVENTION

A disc box with a burglarproof structure is provided for preventing the disc from being stolen.

A disc box according to the present invention is provided that includes a base, a securing member and a key member. The base has a lid and a body, which has a lateral side connected to that of the lid. The lid and the body include latching portions opposite to each other. Key-reception portions are adjacent to the respective latching portions. The latching portions are formed at an internal edge of the lid and the body respectively. The securing member is received in the latching portions for locking the lid and the body together. The key member is arranged inside the key-reception portions in order to retract the securing member that is clamped in the respective latching portion in advance. When the key member is drawn out, the securing member can be withdrawn at the same time.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
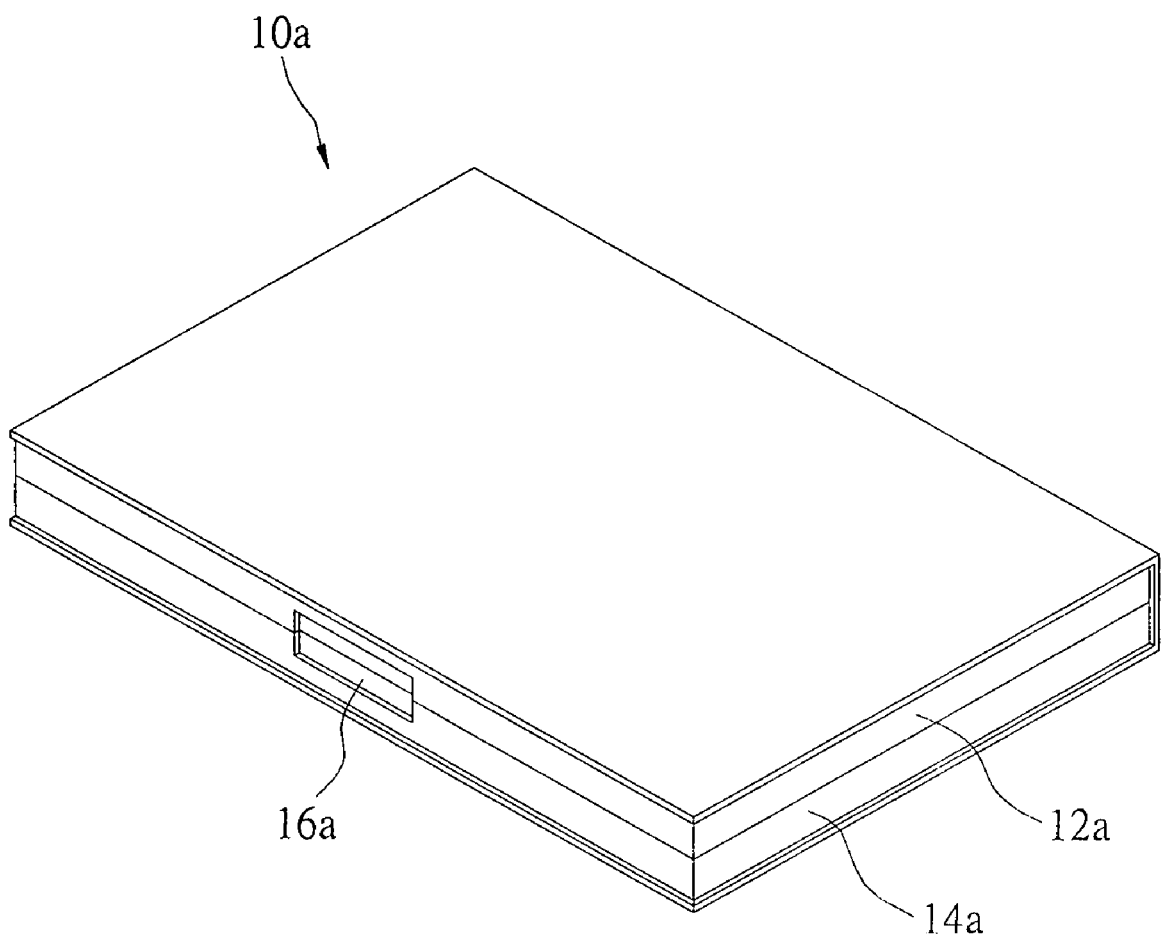
FIG. 1 is a perspective view of a conventional disc box.

Referring to FIGS. 2 to 7, a disc box according to the present invention includes a base 1, a securing member 2 and a key member 3.

The base 1 has a lid 11 and a body 12. The body 12 has a fixing structure to secure a disc. The body 12 has a respective one of two lateral sides connected to that of the lid 11. The lid 11 has a first latching portion 110 formed at an internal edge thereof and having a slot formed thereof longitudinally. The body 12 has a second latching portion 120 formed at an internal edge thereof, relative to the first latching portion 110 and having a slot formed thereof longitudinally.

Figure 4:
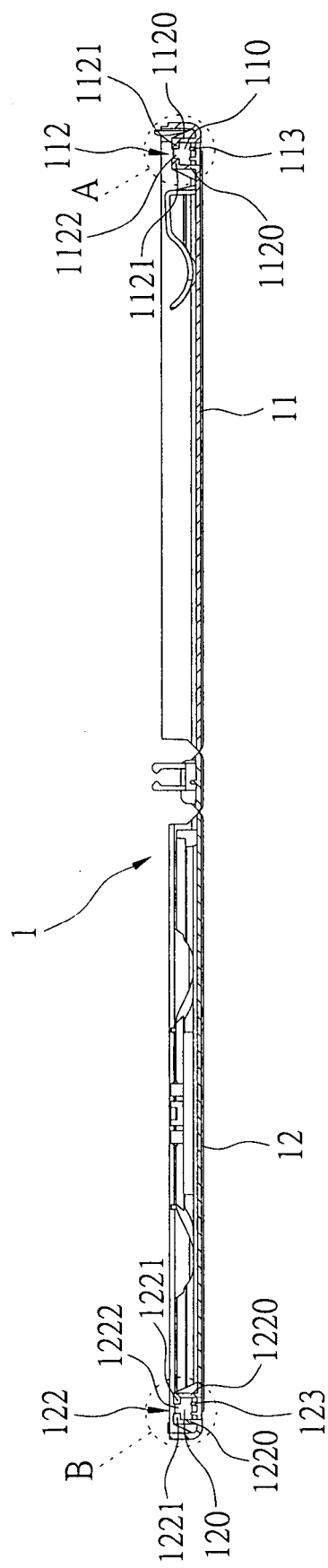
FIG. 4 is a cross-sectional profile according to FIG. 3.
Figure 4A:
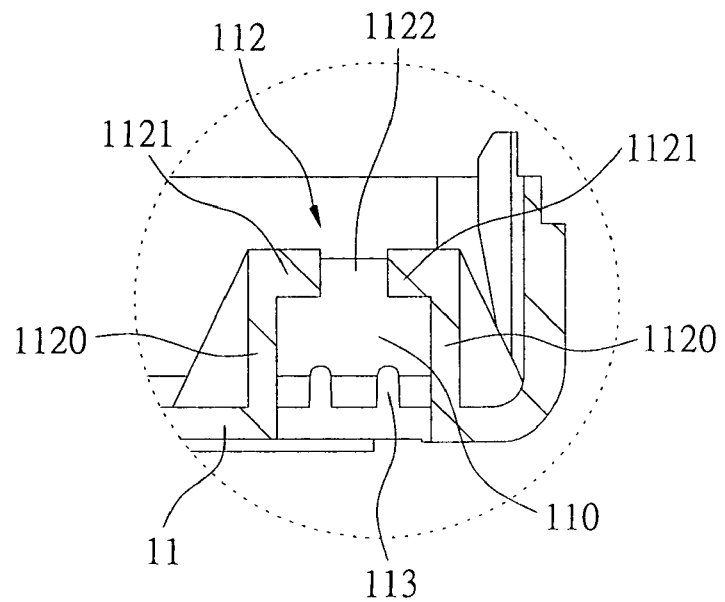
FIG. 4A is an enlarged view of an A part according to FIG. 4.
Figure 4B:
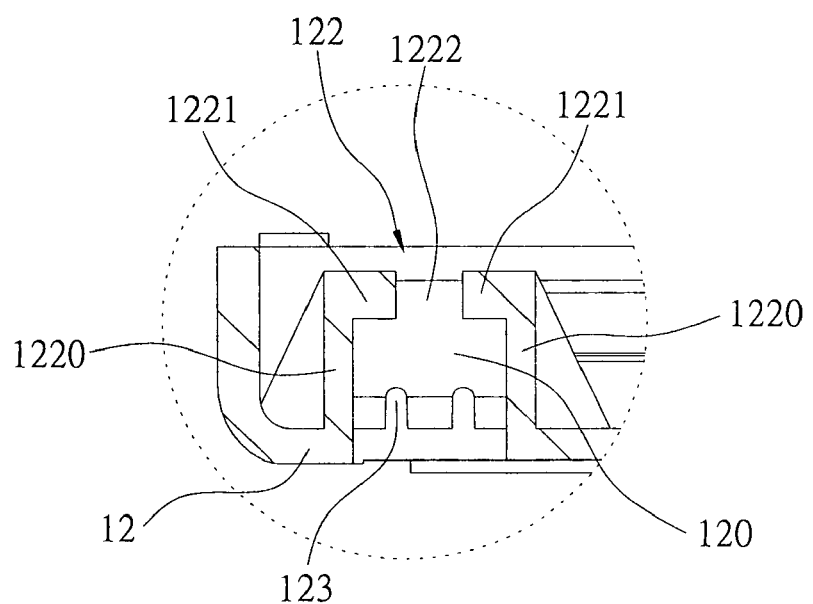
FIG. 4B is an enlarged view of a B part according to FIG. 4.
Figure 5:
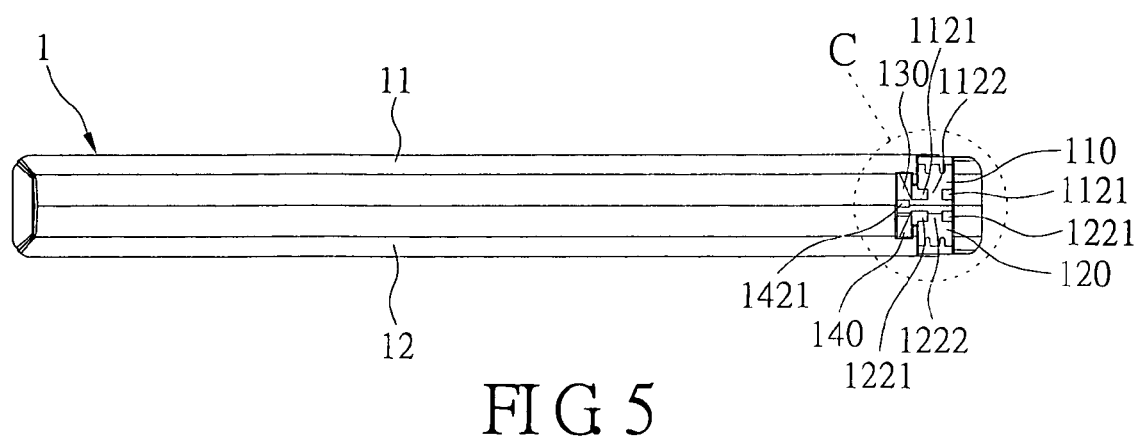
FIG. 5 is a side view of the box according to the present invention when the box is closed.

With respect to FIGS. 4, 4A and 4B, the first latching portion 110 has two first hooks 112 and the second latching portion 120 has two second hooks 122 relative to the first hooks 112. Each of the two first hooks 112 includes two first sidewalls 1120 parallel to each other, two first inner projections 1121 extending from and vertical to the respective first sidewalls 1120 and facing towards each other, and a first channel 1122 formed between the two first inner projections 1121. Each of the two second hooks 122 includes two second sidewalls 1220 parallel to each other and relative to the first sidewalls 1120, two second inner projections 1221 extending from and vertical to the respective second sidewalls 1220 and facing towards each other and relating to the first inner projections 1121, and a second channel 1222 formed between the two second inner projections 1221 and opposite to the first channel 1121. The first latching portion 110 has two first sliding tracks 113 formed at a bottom thereof and parallel to each other, and the second latching portion 120 has two second sliding tracks 123 formed at a bottom thereof and parallel to each other. Therefore, the securing member 2 can slide into the first latching portion 110 and the second latching portion 120 via the first and second sliding tracks 113, 123.

Figure 3:
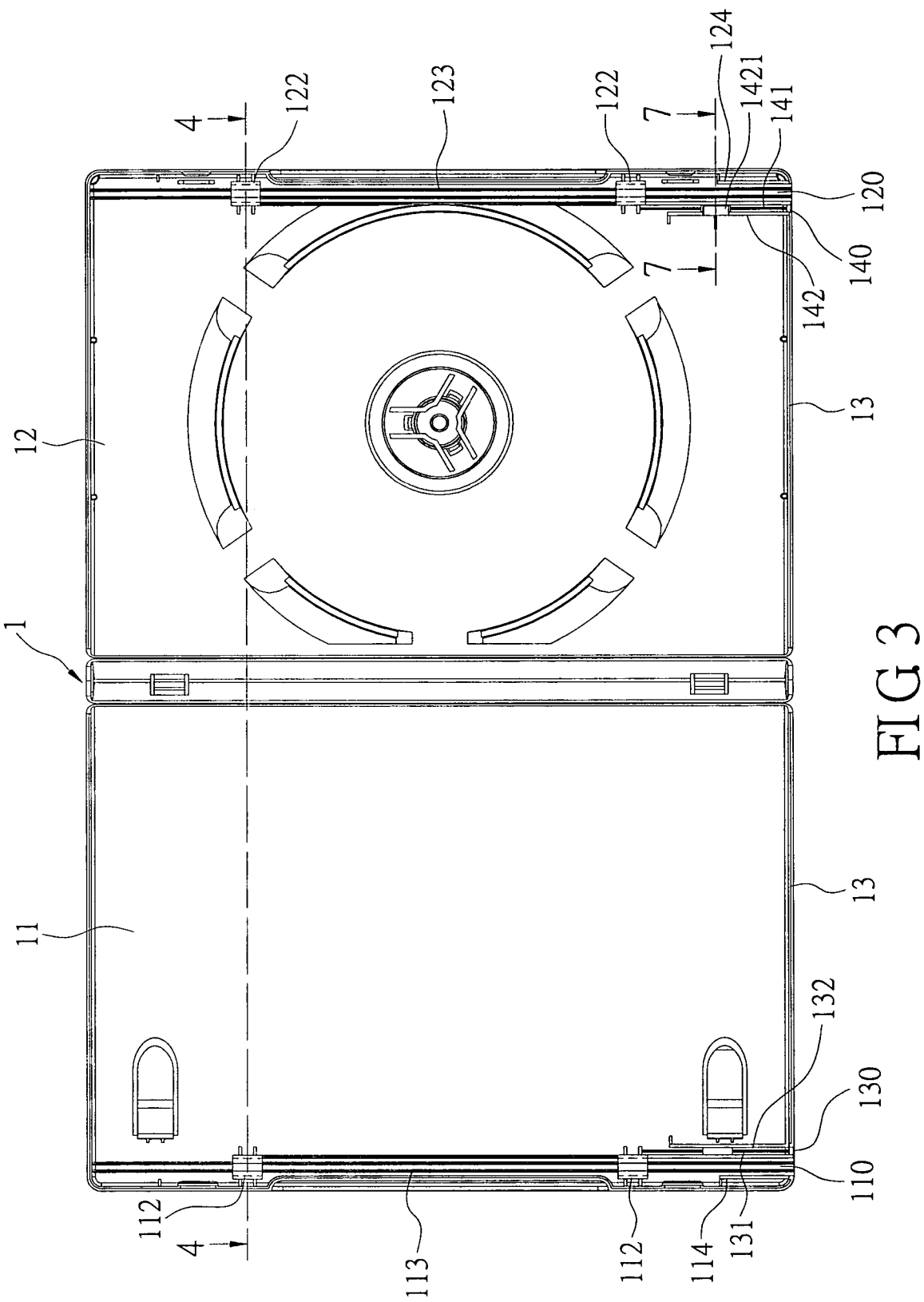
FIG. 3 is a top view of a base of the disc box according to the present invention.
Figure 6:
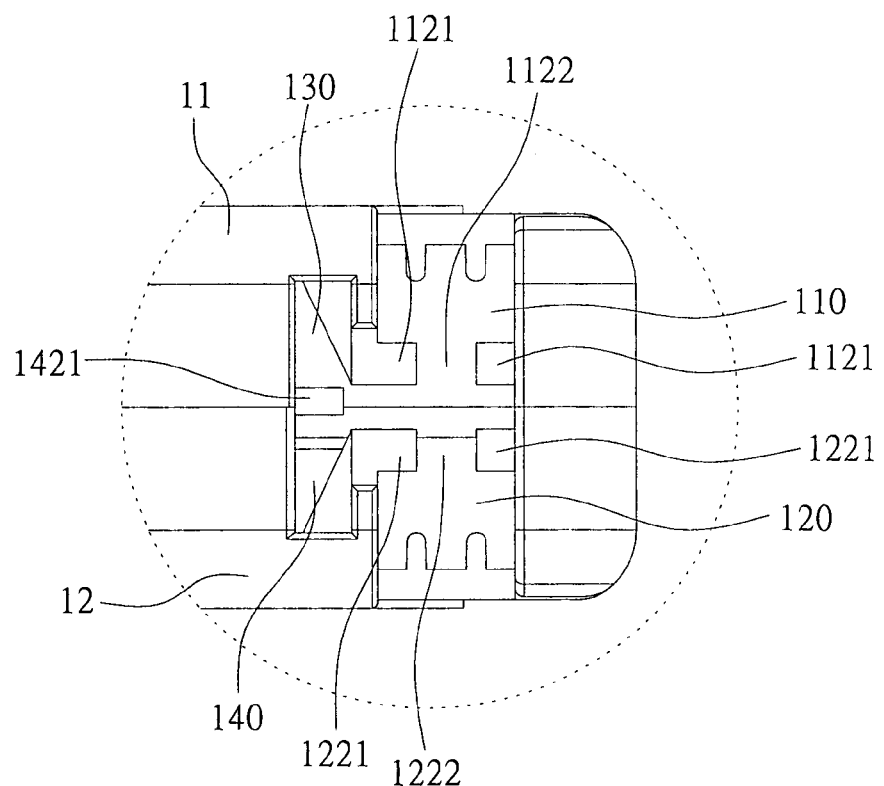
FIG. 6 is an enlarged view of a C part according to FIG. 5.
Figure 7:
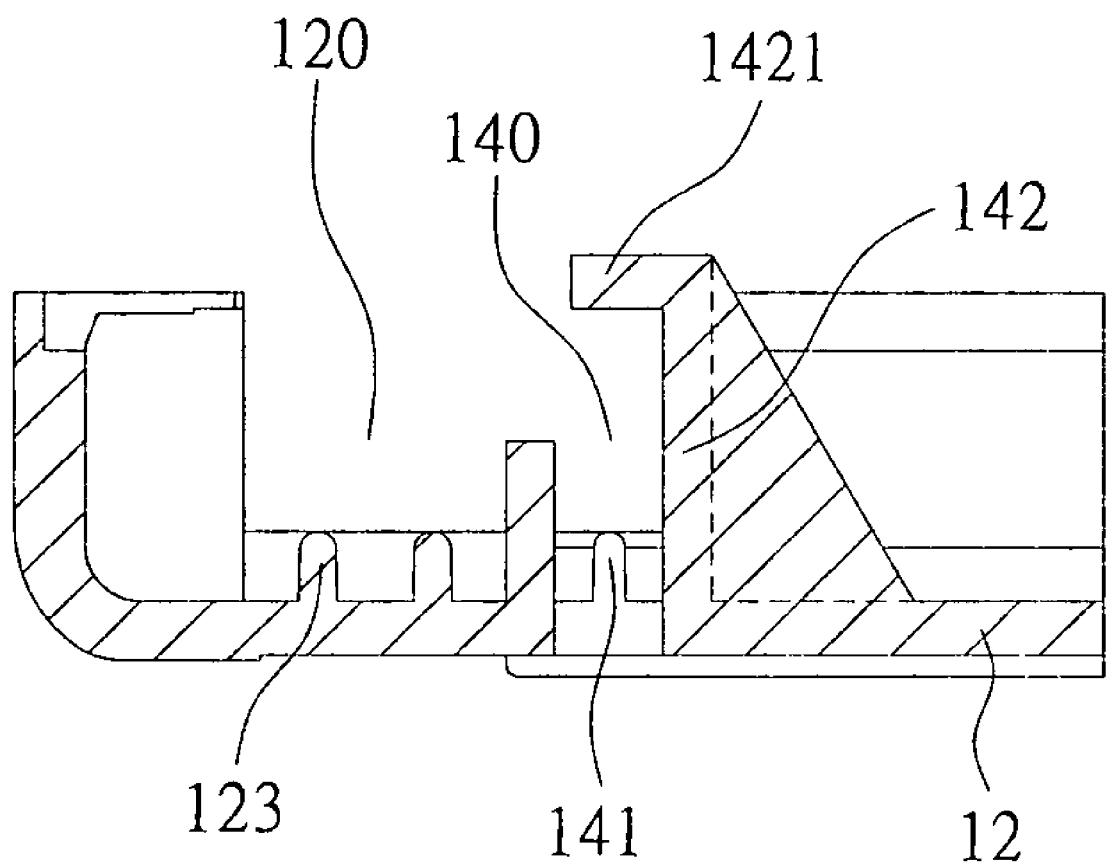
FIG. 7 is a cross-sectional profile along line 7-7 according to FIG. 3.
Figure 8:
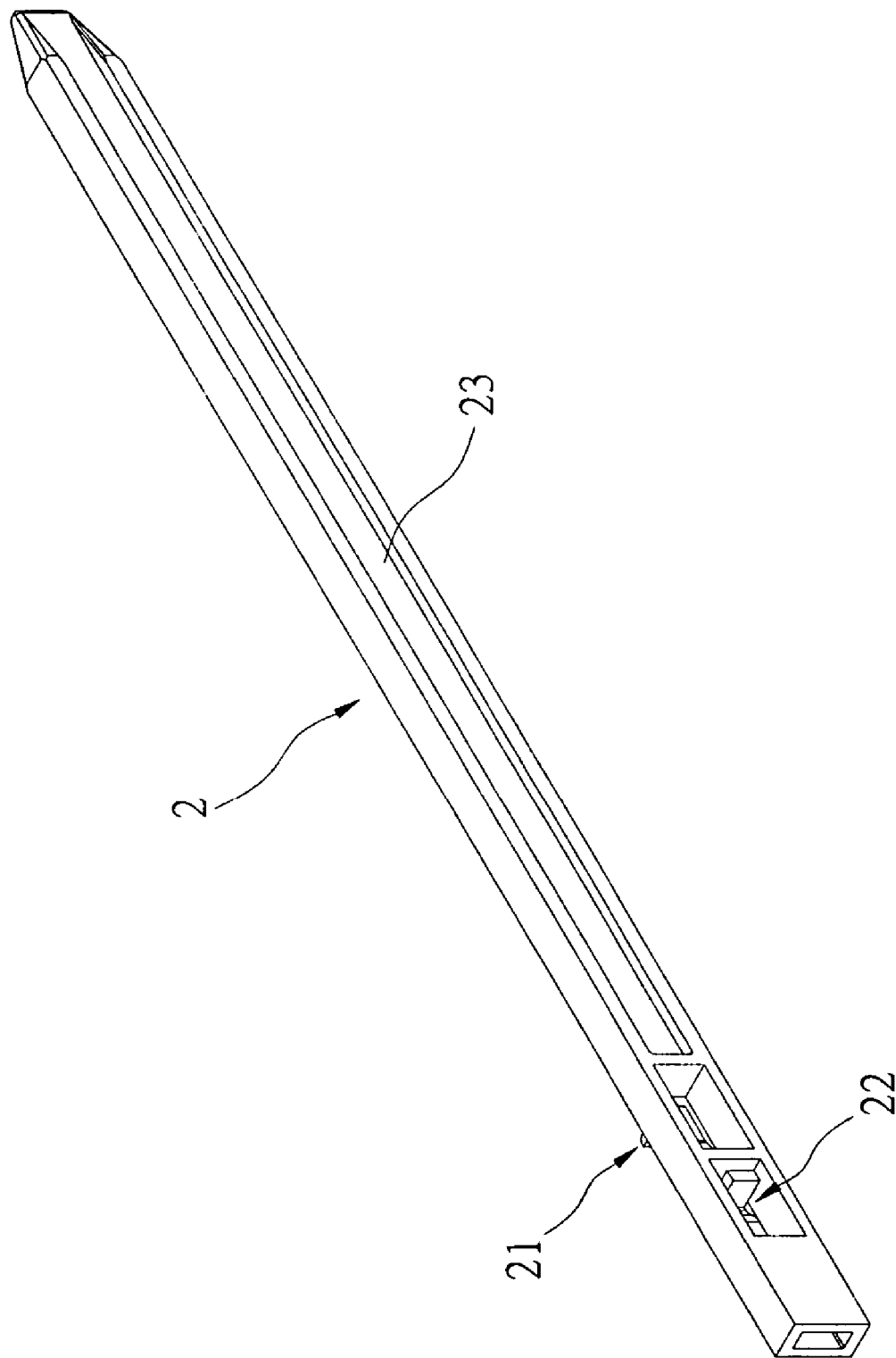
FIG. 8 is a perspective view of a securing member according to the present invention.

With respect to FIGS. 3 and 6, the lid 11 includes a first key-reception portion 130 adjacent to the respective first latching portion 110, and the first key-reception portion 130 has a third sliding track 131 formed at a bottom thereof. The body 12 includes a second key-reception portion 140 adjacent to the respective second latching portion 120, and the second key-reception portion 140 has a fourth sliding track 141 formed at a bottom thereof. Therefore, the key member 3 can slide between the first and second key-reception portions 130, 140. The first key-reception portion 130 has a first straight partition 132 extending from a lateral side 13 of the disc box for being parallel to the first latching portion 110. The second key-reception portion 130 has a second straight partition 142 extending from the lateral side 13 of the disc box and is disposed parallel to the second latching portion 120. Referring to FIG. 7, the second straight partition 142 has a stopping member 1421 disposed thereon and protruding therefrom and extending towards the slit, so that the securing member 2 can be removed from the first and second key-reception portions 130, 140.

With reference to FIGS. 8 to 11, the securing member 2 penetrates through the first and second key-reception portions 110, 120 and is received in the slits thereof, so that the body 12 and the lid 11 are locked together.

Figure 9:
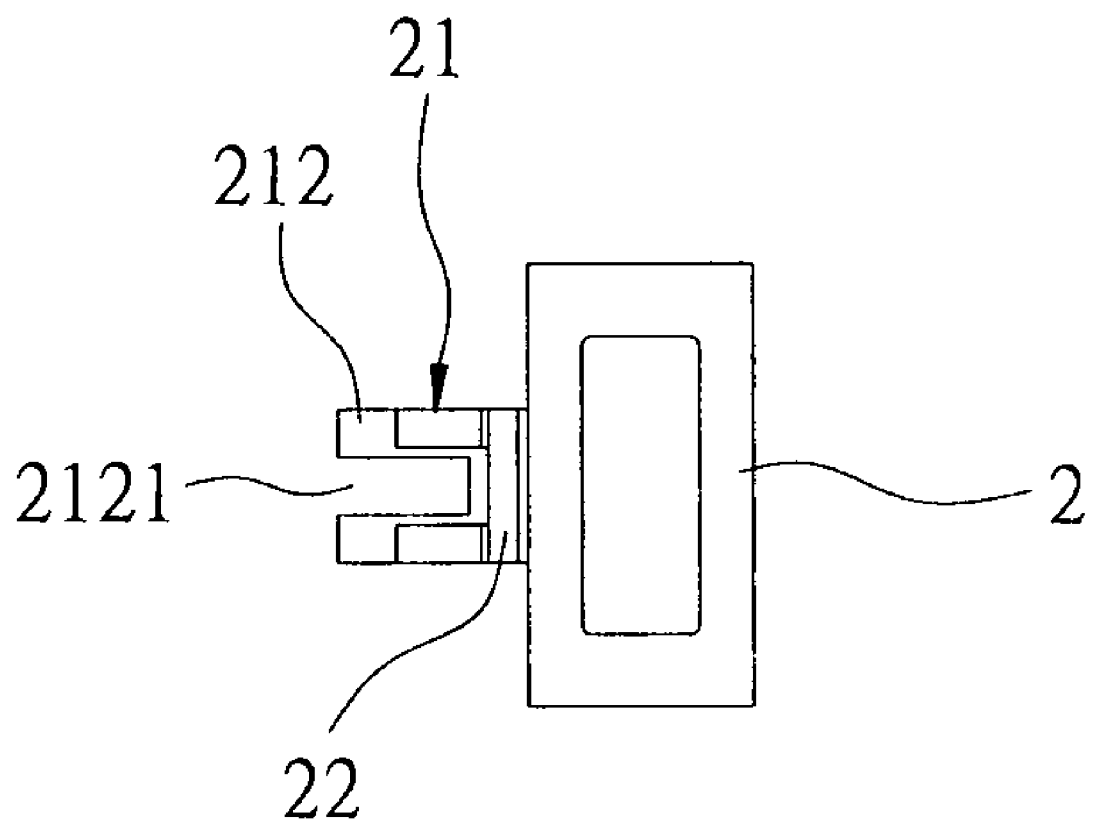
FIG. 9 is a rear view of the securing member according to the present invention.
Figure 10:
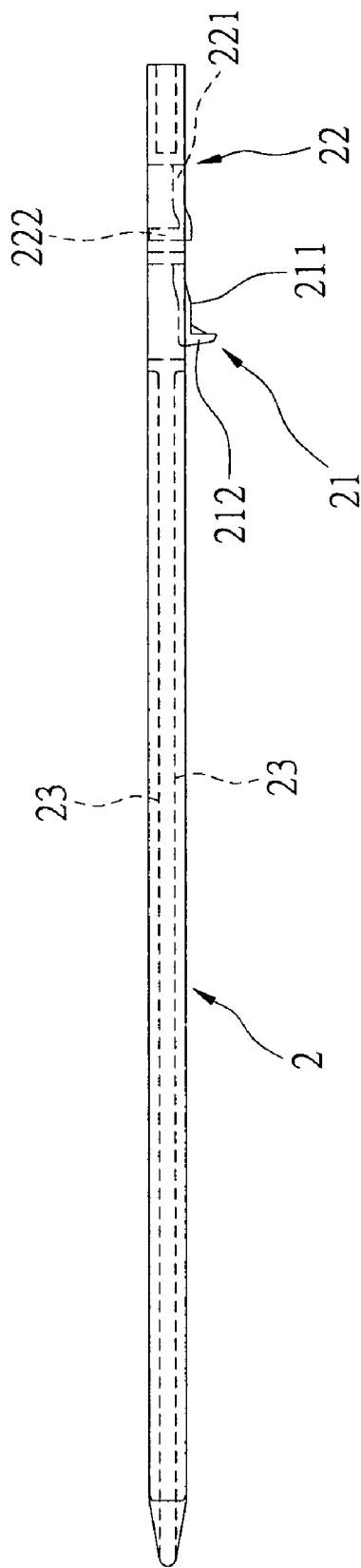
FIG. 10 is a top view of the securing member according to the present invention.

With reference to FIGS. 9 and 10, the securing member 2 includes a resilient clamping portion 21 arranged at a respective one of the lateral sidewalls thereof. The resilient clamping portion 21 has an arm 211 disposed at an end thereof and connected to the securing member 2 for providing flexibility thereof, and a hook portion 212 disposed at an opposite end of the arm 211. The hook portion 212 is arranged at a front end of the resilient clamping portion 21 and projected from the lateral sidewall of the securing member 2. The hook portion 212 includes a passageway 2121 recessed at a front end thereof and corresponding to the stopping member 1421 (shown in FIG. 7), so that the resilient clamping portion 21 of the securing member 2 slides over the passageway 2121 until the front end of the resilient clamping portion 21 hooks one of the lateral sidewalls of the second straight partition 142 (shown in FIG. 15). The securing member 2 further has a resilient tenon 22 disposed at a respective one of the lateral sidewalls thereof. The resilient tenon 22 is disposed behind the resilient clamping portion 21. The resilient tenon 22 includes an arm 221, which has an end connected to the securing member 2 for providing the flexibility thereof, and a push plate 222 connected to an opposite end of the arm 221. The opposite end of the arm 221 is projected from a respective one of the lateral sidewalls of the securing member 2, so that the push plate 222 is exposed from the securing member 2.

Figure 2:
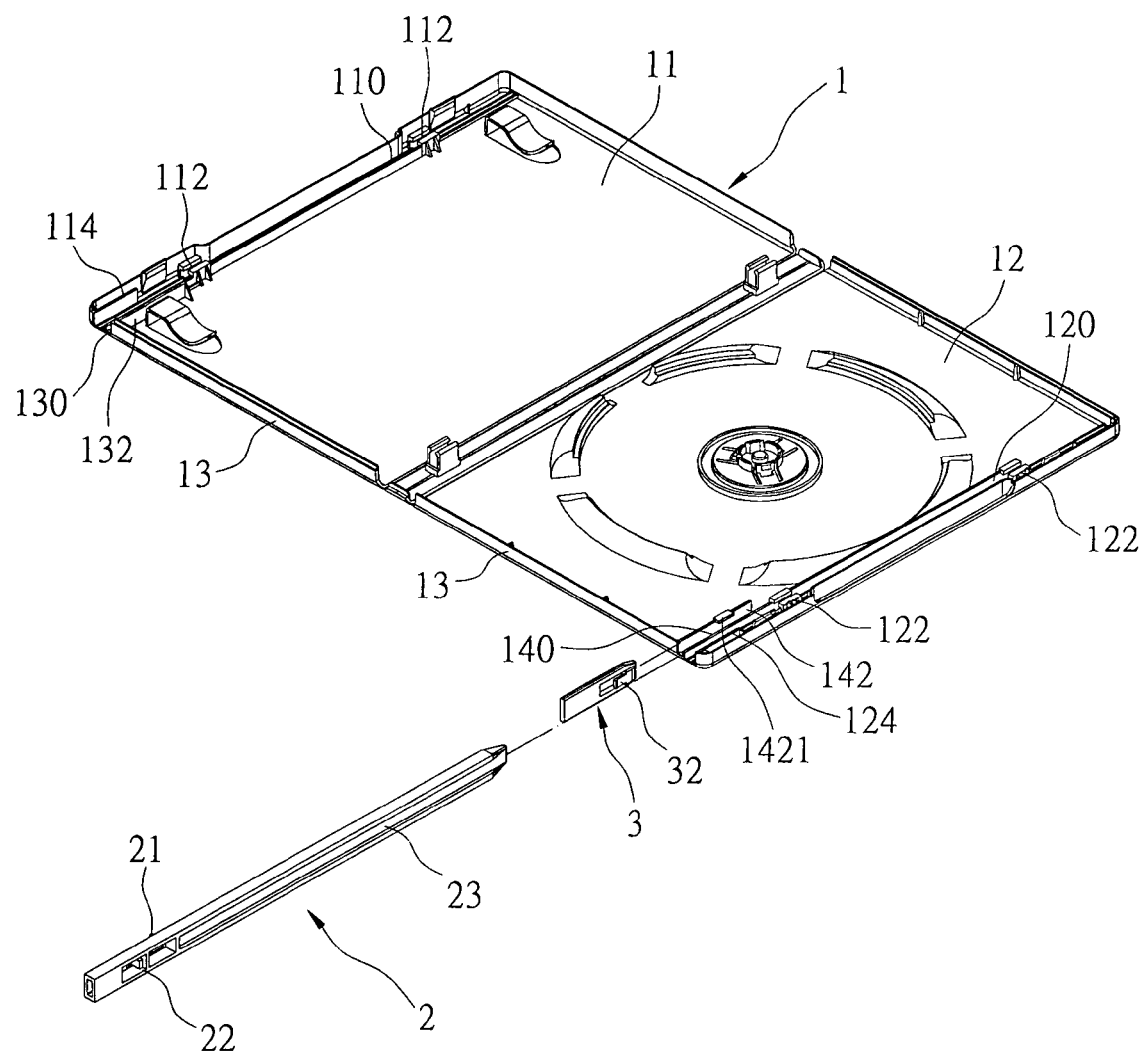
FIG. 2 is a decomposition view of a disc box according to the present invention.
Figure 15:
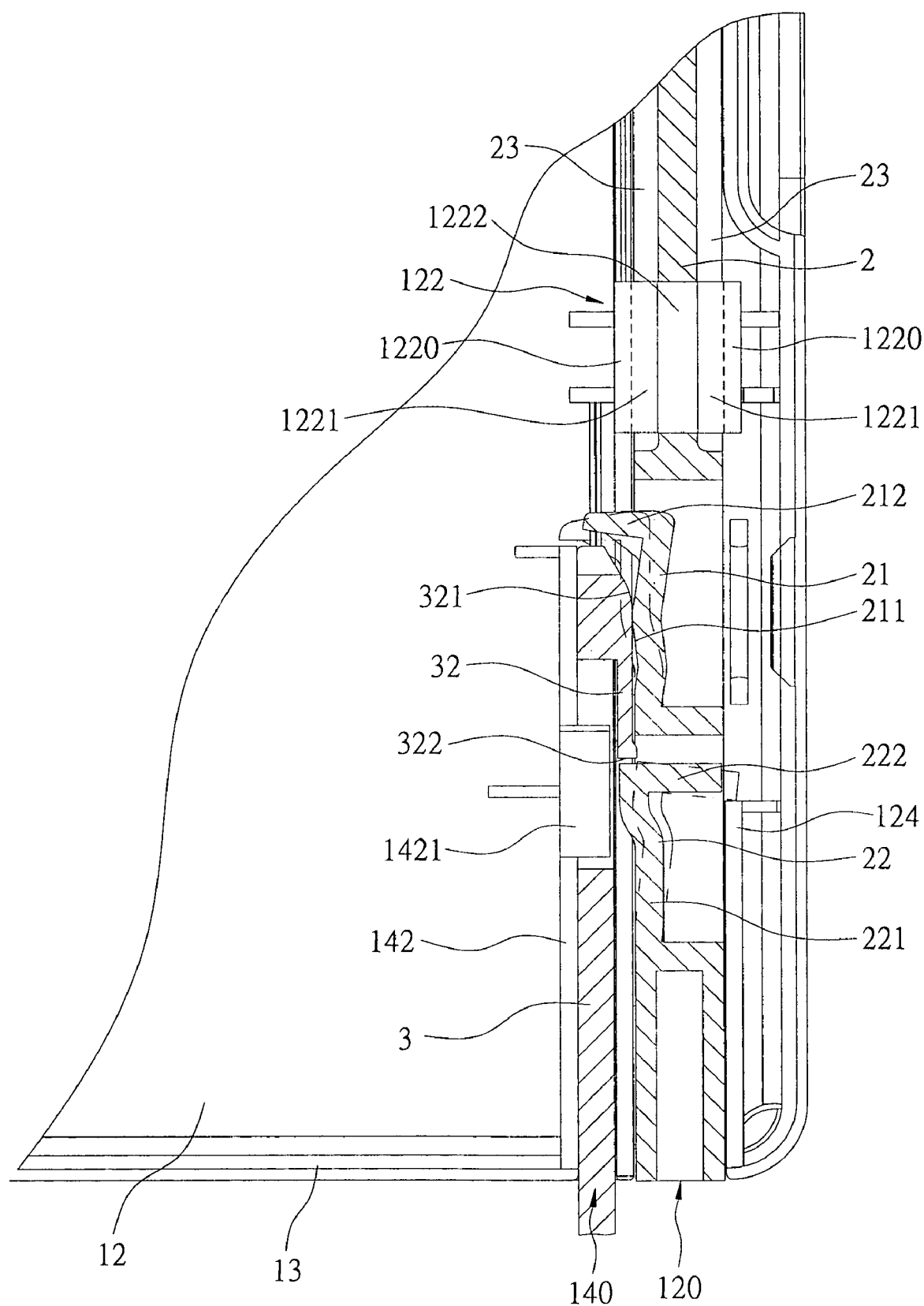
FIG. 15 is a cross-sectional profile of the disc box according to the present invention.

Referring to FIG. 15, when a thief tries to remove the securing member 2 to open the base 1, the thief must first break the stopping member 1421 and further push the hook portion 212 of the resilient clamping portion 21 away. Thus, the hook portion 212 no longer hooks onto the second straight partition 142 of the second key-reception portion 140 or the first straight partition 132 of the first key-reception portion 130, as shown in FIG. 2. When a tool is used by a thief to avoid the stopping member 1421, the tool pushes the resilient tenon 22 away first. After the resilient tenon 22 is pushed away, a free end of the push plate 222 of the resilient tenon 22 will hook onto the fourth straight partition 124 of the second latching portion 120 or the third straight partition 114 of the first latching portion 110, as shown in FIG. 2. Therefore, even when a tool pushes the hook portion 212 away, the securing member 2 is still not pulled out of the disc box. In this way the disc box achieves a burglarproof function.

Figure 11:
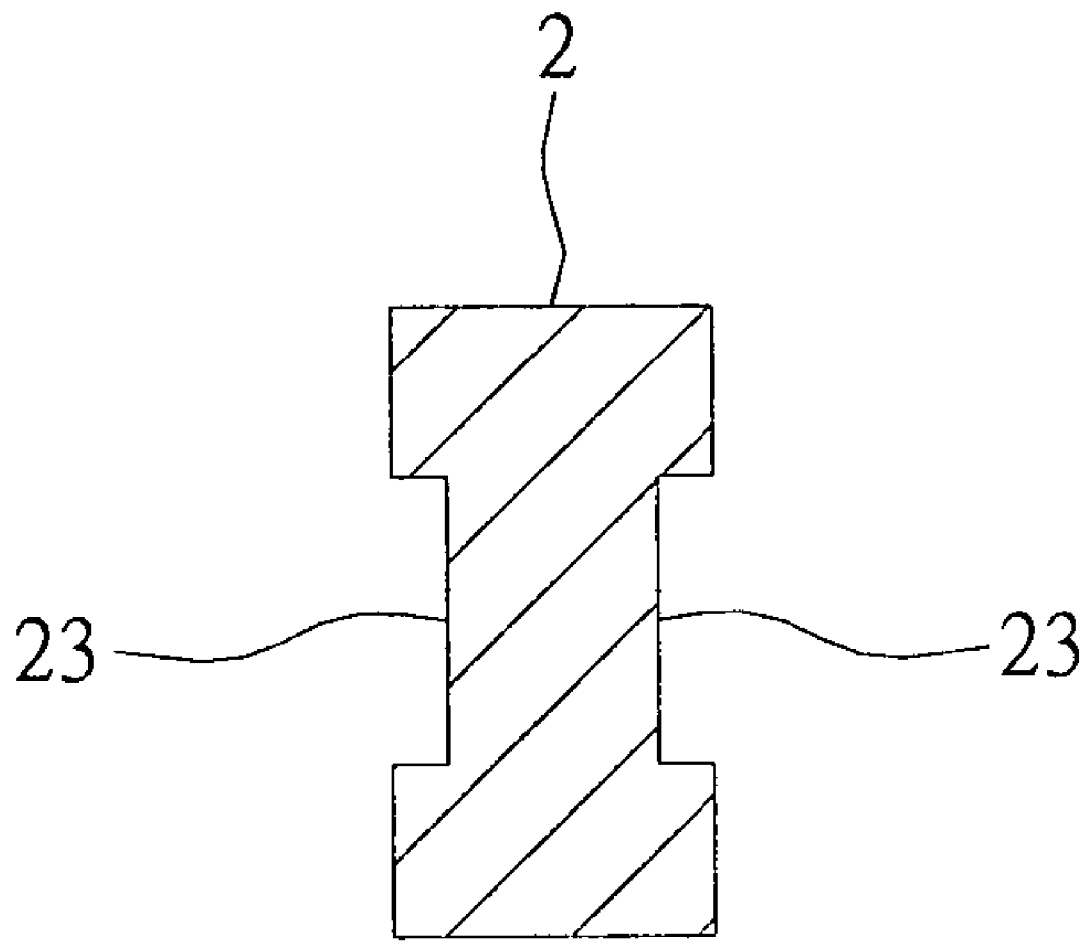
FIG. 11 is a cross-sectional profile of the securing member according to the present invention.

With respect to FIGS. 10 and 11, the securing member 2 has two sliding slots 23 formed at two lateral sidewalls thereof in order to correspond to the first and second inner projections 1121 and 1221, thus the securing member 2 slides along the first and second channels 1122 and 1222 in order to secure the lid 11 to the body 12. The securing member 2 has an end wall retained against the first and second sliding tracks 113 and 123 (as shown in FIGS. 4A and 4B). Therefore, the securing member 2 can slide into the slots of first and second latching portions 110 and 120 (as shown in FIG. 6).

Figure 12:
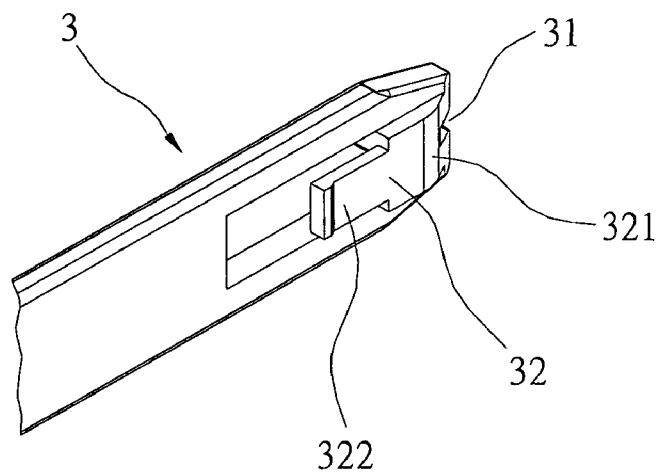
FIG. 12 is a perspective view of a key member according to the present invention.
Figure 13:
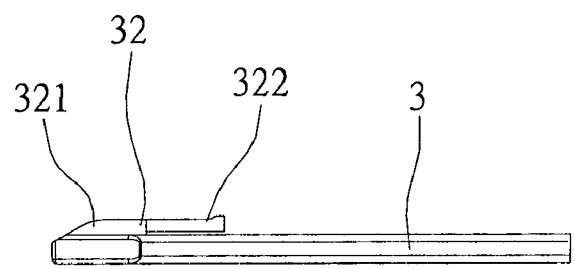
FIG. 13 is a top view of the key member according to the present invention.
Figure 14:
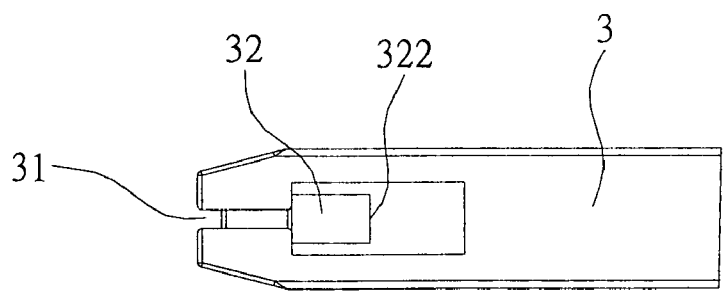
FIG. 14 is a side view of key member according to the present invention.

With respective to FIGS. 12 to 14, the key member 3 is received in the slit of the first and second key-reception portions 130 and 140 in order to retract the securing member 2 that is clamped in the respective latching portion in advance.

Referring to FIG. 14, the key member 3 has an entranceway 31 formed at a respective one of the lateral sidewalls thereof to correspond to the stopping member 1421, so that the key member 3 can avoid the barricade of the stopping member 1421 and slide into the slits of the first and second key-reception portion 130 and 140. Referring to FIG. 13, the key member 3 further includes a pushing member 32 disposed at the other one of the lateral sidewalls to push the resilient clamping portion 21 away so that the securing member 2 is retracted. Referring to FIG. 12, the pushing member 32 has a retaining portion 321 and a forcing portion 322 disposed at an edge of the retaining portion 321. A free end of the pushing member 32 faces an end of the resilient tenon 22 (in FIG. 15). That means the free end of the forcing portion 322 faces a surface of the push plate 222.

When the key member 3 pushes the hook portion 212 of the resilient clamping portion 21 away, the forcing portion 322 of the pushing member 32 corresponds to the surface of the push plate 222, the forcing portion 322 pushes the push plate 222 in order to retract the securing member 2.

Figure 16:
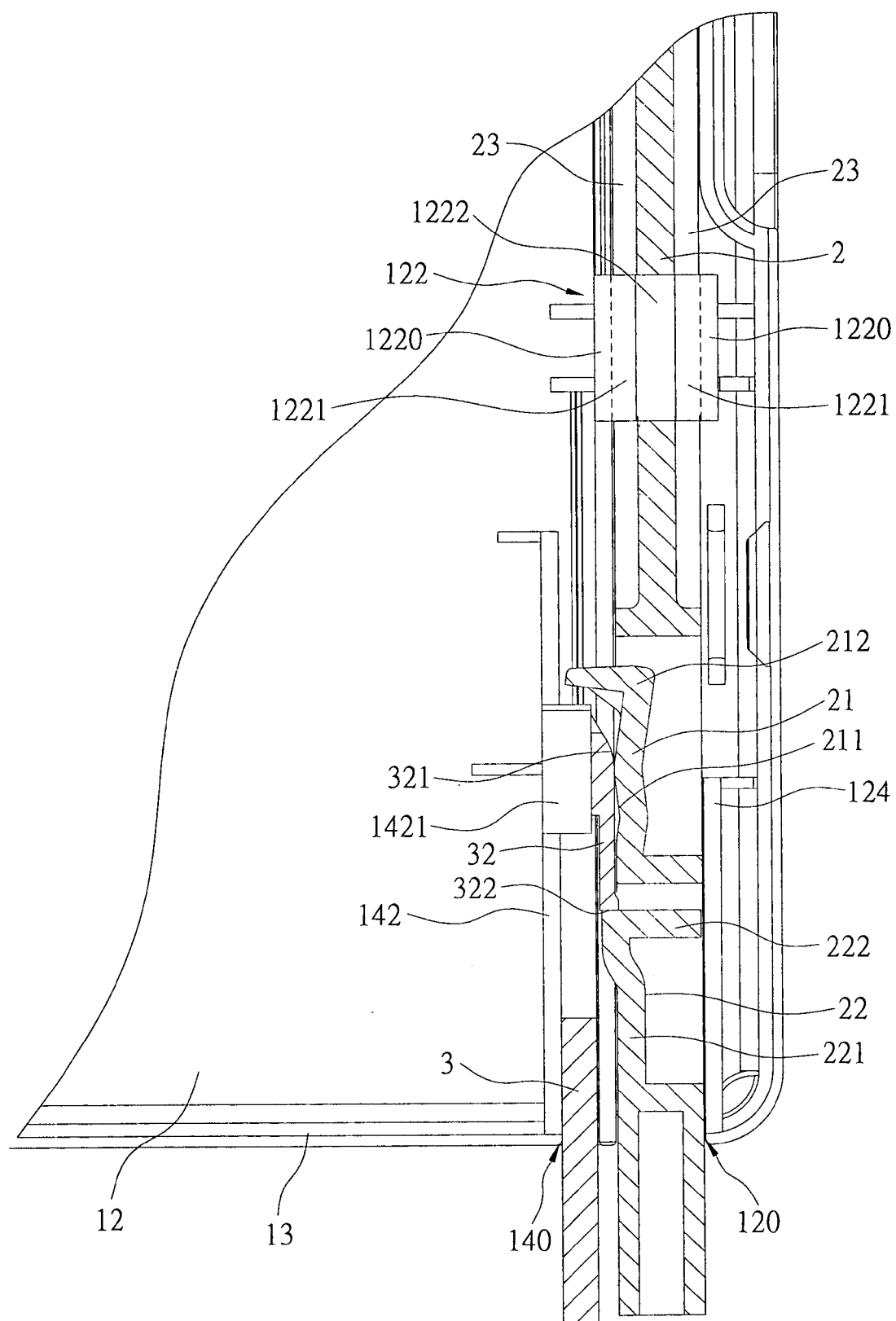
FIG. 16 is a cross-sectional profile of the disc box according to the present invention when the key member is being retracted from the base.

Referring to FIG. 15, when the key member 3 slides into the first and second key-reception portions 130 and 140, the retaining portion 321 of the pushing member 32 pushes the arm 211 of the resilient clamping portion 21 away. The hook portion 212 of the resilient clamping portion 21 hooks the second straight partition 142 of the second key-reception portions 140 no more. The key member 3 is pulled, so that the free end of the forcing portion 322 pushes the push plate 222 of the resilient tenon 22. Therefore, the securing member 2 that is locked inside the first and second key-reception portions 110 and 120 can be removed out of the disc box. After the securing member is drawn, the base 1 of the disc box is open and the disc arranged therein can be removed (in FIG. 16).

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A disc box comprising:
   a base including a lid and a body, which has a lateral side connected to that of the lid;
   wherein the lid and the body include latching portions opposite to each other and key-reception portions adjacent to the respective latching portions, and the latching portions are formed at an internal edge of the lid and the body respectively;
   wherein each of the latching portions has a slot formed thereof longitudinally and are relative to each other, each of the key-reception portions has a slit formed thereof and are relative to each other; each of the latching portions has two hooks disposed relatively to each other; each of the two hooks includes two sidewalls parallel to each other, two inner projections extending from the respective sidewalls and facing towards each other, and a channel formed between the two inner projections; each of the latching portions and the key-reception portions has a sliding track formed at a bottom thereof; each of the key-reception portions has a straight partition extending from a lateral side thereof, and a stopping member disposed on and protruding from the straight partition and towards the slit;

a securing member penetrating through the key-reception portion and received in the slit thereof so that the body and the lid are locked;

wherein the securing member has two sliding slots formed at two lateral sidewalls thereof in order to correspond to the two inner projections, thus the securing member slides along the channel in order to secure the lid to the body;

wherein the securing member has an end wall contacting the sliding track so as to slide into the slot of the respective latching portion;

wherein the securing member includes a resilient clamping portion arranged at a respective one of the lateral sidewalls thereof; the resilient clamping portion has a passageway recessed at a front end thereof to correspond to the stopping member so that the resilient clamping portion of the securing member slides over the passageway until the front end of the resilient clamping portion hooks one of the lateral sidewalls of the second straight partition;

wherein the securing member has a resilient tenon disposed at a respective one of the lateral sidewalls; and a key member arranged inside the slit of the respective key-reception portion in order to retract the securing member that is clamped in the respective latching portion;

wherein the key member has an entranceway formed at a respective one of the lateral sidewalls thereof to correspond to the stopping member so that the key member slides into the slit of the respective key-reception portion, and a pushing member disposed at the other one of the lateral sidewalls to push the resilient clamping portion;

wherein the pushing member has a retaining portion and a forcing portion disposed at an edge of the retaining portion.

2. The disc box as claimed in claim 1, wherein the resilient clamping portion includes an arm disposed at an end thereof and connected to the securing member for providing flexibility thereof, and a hook portion disposed at an opposite end of the arm; wherein the passageway is formed on the hook portion.

3. The disc box as claimed in claim 2, wherein the resilient tenon includes an arm, which has an end connected to the securing member for providing the flexibility thereof, and a push plate connected to an opposite end of the arm; wherein the opposite end of the arm is projected from a respective one of the lateral sidewalls of the securing member, so that the push plate is exposed from the securing member; whereby the forcing portion of the pushing member corresponds to a surface of the push plate for retracting the key member from the securing member, when the key member pushes the hook portion of the resilient clamping portion; in addition, the push plate has a free end hooking onto a respective one of the lateral sidewalls of the securing member when the arm of the resilient tenon is forced from outside; the securing member is locked onto the hook portion when the resilient tenon is pressed so as to guarantee that the disc box is burglarproof.

* * * * *